United States Patent [19]

Spillman

[11] 4,172,574
[45] Oct. 30, 1979

[54] FLUID STREAM DEFLECTING MEMBERS FOR AIRCRAFT BODIES OR THE LIKE

[75] Inventor: John J. Spillman, Bedford, England

[73] Assignee: National Research Development Corporation, London, England

[21] Appl. No.: 805,438

[22] Filed: Jun. 10, 1977

[30] Foreign Application Priority Data

Jun. 16, 1976 [GB] United Kingdom ............... 24943/76
Mar. 1, 1977 [GB] United Kingdom ............... 08666/77

[51] Int. Cl.² ............................................. B64C 23/00
[52] U.S. Cl. ...................................... 244/199; 114/272; 244/91; 244/130; 244/204; 415/DIG. 1
[58] Field of Search ............... 244/198, 199, 200, 130, 244/204, 218, 91, 87; 296/15; 114/67 R, 152, 272–274; 415/DIG. 1; 416/23, 87

[56] References Cited

U.S. PATENT DOCUMENTS

| 1,466,551 | 8/1923 | Thurston | 244/218 |
| 1,841,921 | 1/1932 | Spiegel | 244/199 |
| 1,888,418 | 11/1932 | Adams | 244/218 |
| 2,111,274 | 3/1938 | Bellanca | 244/218 X |
| 2,418,301 | 4/1947 | Heal | 244/91 X |
| 2,576,981 | 12/1951 | Vogt | 244/130 X |
| 2,743,888 | 5/1956 | Lippisch | 244/130 X |
| 3,270,988 | 9/1966 | Cone | 244/199 X |

FOREIGN PATENT DOCUMENTS

| 2149956 | 4/1973 | Fed. Rep. of Germany | 244/198 |
| 196410 | 4/1923 | United Kingdom | 244/200 |

*Primary Examiner*—Barry L. Kelmachter
*Attorney, Agent, or Firm*—Cushman, Darby & Cushman

[57] ABSTRACT

Devices to reduce the drag experienced by aircraft and other travelling bodies, comprising sail-like members mounted on the body surface. These members project into the local stream that forms close to the surface during motion, and tend to divert that local stream back into the free stream direction and in so doing to experience useful thrust. The members are cambered and the camber varies from root to tip to allow for change in the local stream direction as distance from the surface increases. Special sails for use on surfaces subject to some complex flows, adjustable sails and arrays of several sails for use especially at aircraft wing tips, are also proposed.

11 Claims, 13 Drawing Figures

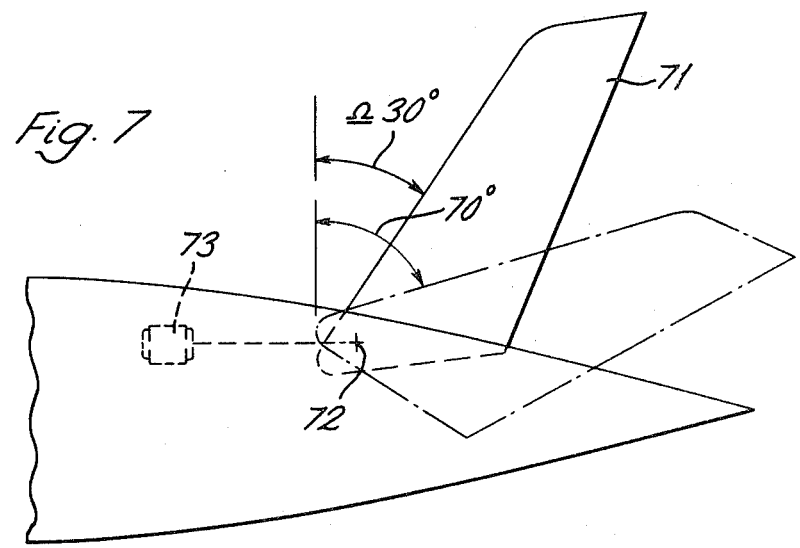
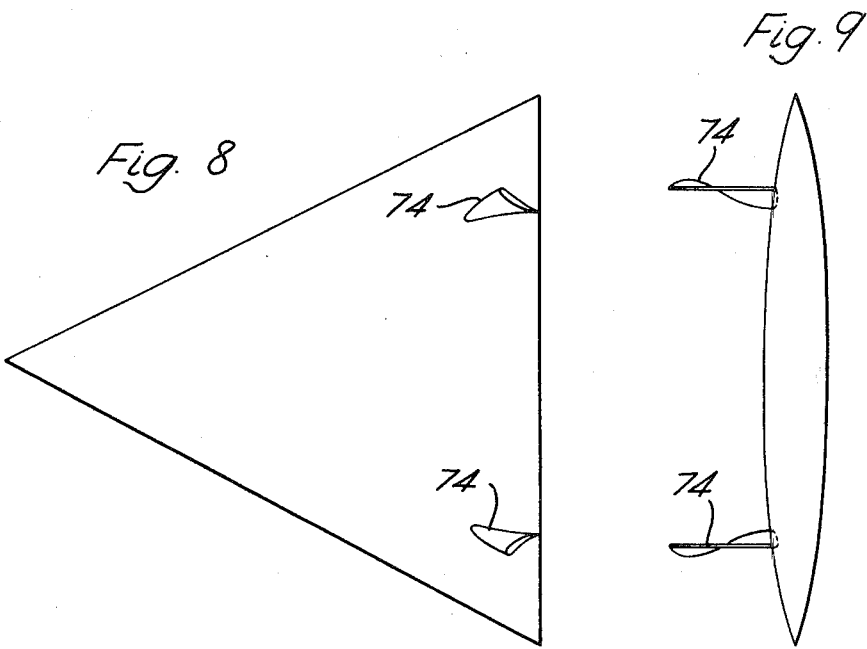

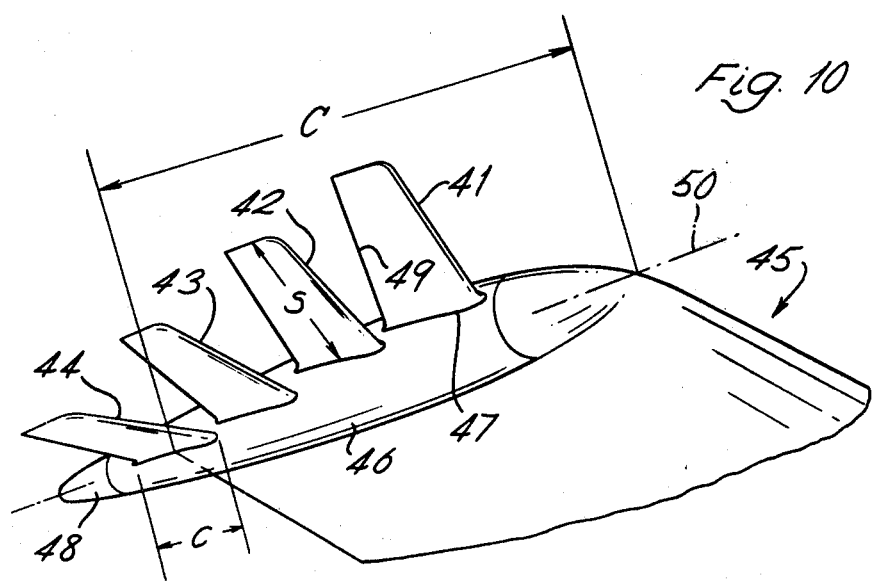
Fig. 10
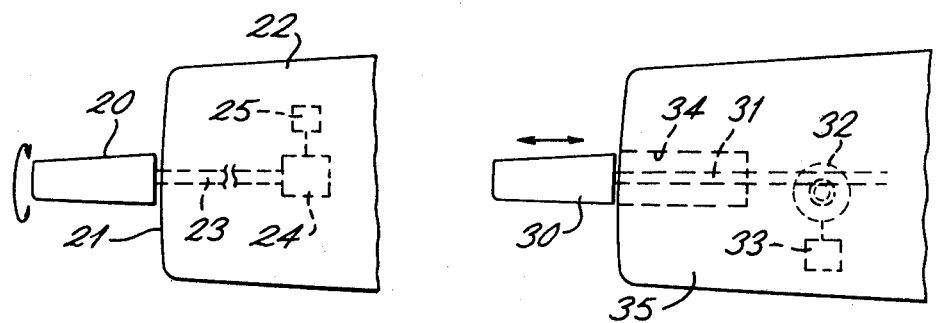
Fig. 11
Fig. 12
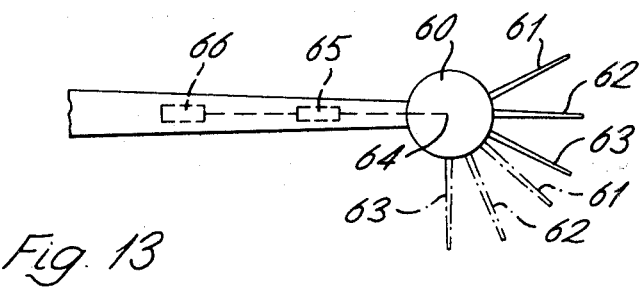
Fig. 13

FLUID STREAM DEFLECTING MEMBERS FOR AIRCRAFT BODIES OR THE LIKE

This invention relates to devices to reduce the drag experienced by craft in motion relative to masses of fluid, and especially by aircraft, and in particular to reduce the drag resulting from the fact that in producing lift, various parts of an aircraft create local streams or flows whose directions are different from that of the free stream. This is particularly the case near to the wing tips of conventional aircraft. By "free stream direction" we mean the direction of the air relative to the aircraft, measured well ahead of the aircraft. It is well known to mount flat fins at or close to such tips to obstruct the prominent local flow of air which in flight passes around such tips from the lower side of the wing to the upper, but the usefulness of such fins has generally been confined to destroying this drag-inducing local flow; the fins have seldom been shaped so as to generate any more positively useful forces by reason of their reaction with the flow. In a few cases it has been proposed to shape wing fins so that their reaction with local flows gives rise to such positive forces, but in such cases it appears that the barrier function of the fins was still uppermost in the minds of the designers and that the possibility of achieving much more substantial benefits by the correct shaping and setting of the fins was not appreciated.

The present invention results from considering such possibilities further, and in particular from considering the possibility of fins so shaped that they might generate thrust in a manner analogous to that of a close-hauled sail on a boat. The invention will now be described, by way of example, with reference to the accompanying drawings in which:

FIG. 1 shows a device in elevation;

FIG. 2 comprises sections on the lines A and B in FIG. 1;

FIG. 7 shows a variable sweep device diagrammatically;

FIG. 8 is a diagrammatic plan view of devices fitted to a delta wing:

FIG. 9 is a front elevation of the parts shown in FIG. 8;

FIG. 10 is a diagrammatic perspective view of an aircraft wing tip fitted with four devices;

FIGS. 11 and 12 are diagrammatic plan views of alternative devices, and

FIG. 13 is a diagrammatic front elevation of a further alternative device.

Figure 1:
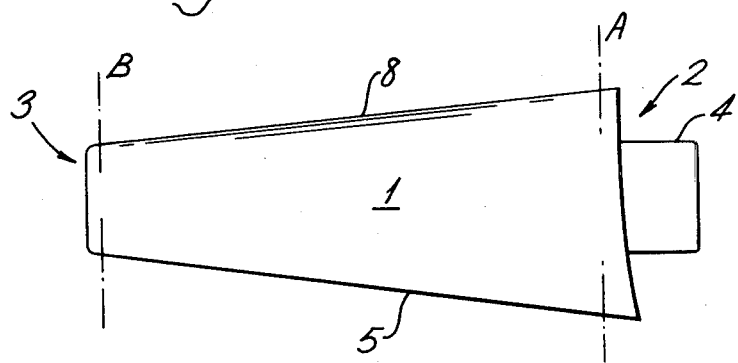

The device shown in FIG. 1 is a rigid member 1 (which will be referred to as a sail) having a root end 2 and tip end 3 and carrying at its root end a stub 4 by which it may be mounted upon an aircraft surface. The sail is of aerofoil section from root to tip. The tangents to the sail centre (or camber) line 7 at the trailing edge 5 lie in a common plane throughout the length of the sail, and the two transverse sections of FIG. 2 in planes A and B show that the tangent 6 to line 7 at leading edge 8 in plane A makes a relatively great angle (about 20° in the example drawn) to the plane of the tangents to line 7 at the trailing edge 5, whereas at plane B close to tip 3 the corresponding angle is much less, only about 3° in the same example. Between root and tip this angle falls progressively.

Figure 2:
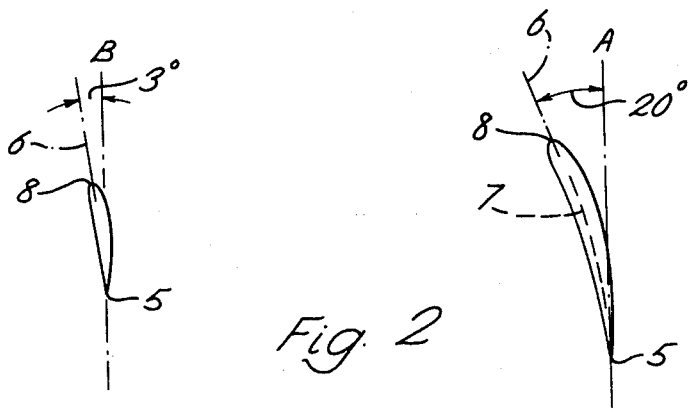
Figure 3:
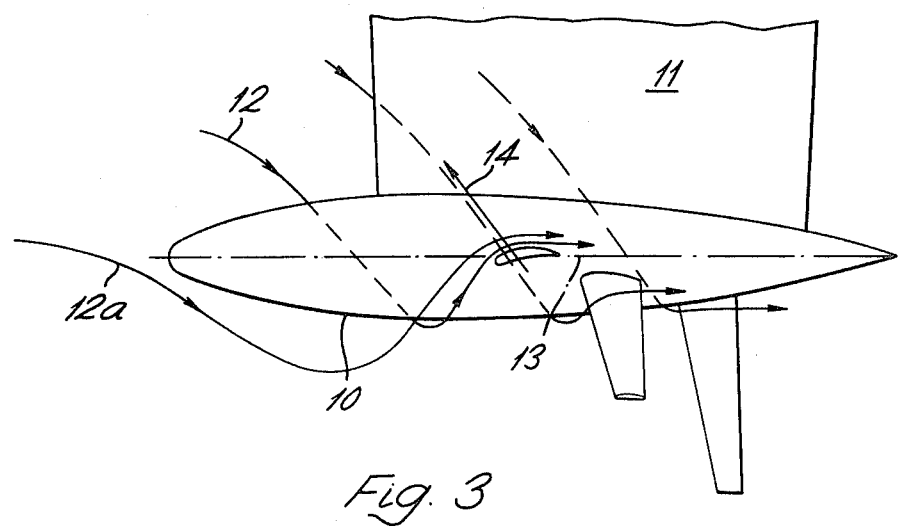
FIG. 3 is a plan view of an aircraft wing tip and tip tank fitted with such a device.
Figure 4:
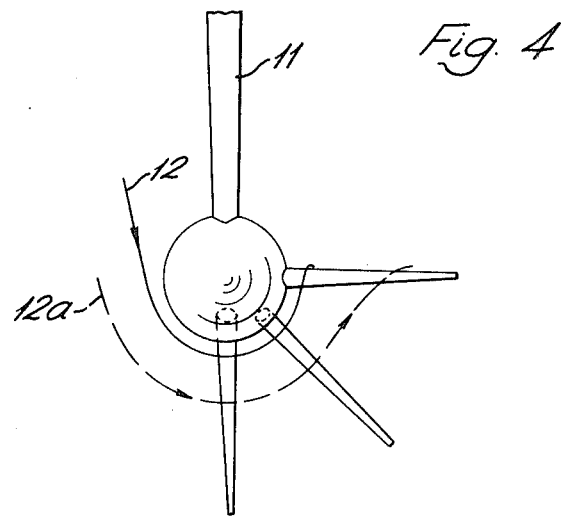
FIG. 4 is a front elevation of the parts shown in FIG. 3.
Figure 5:
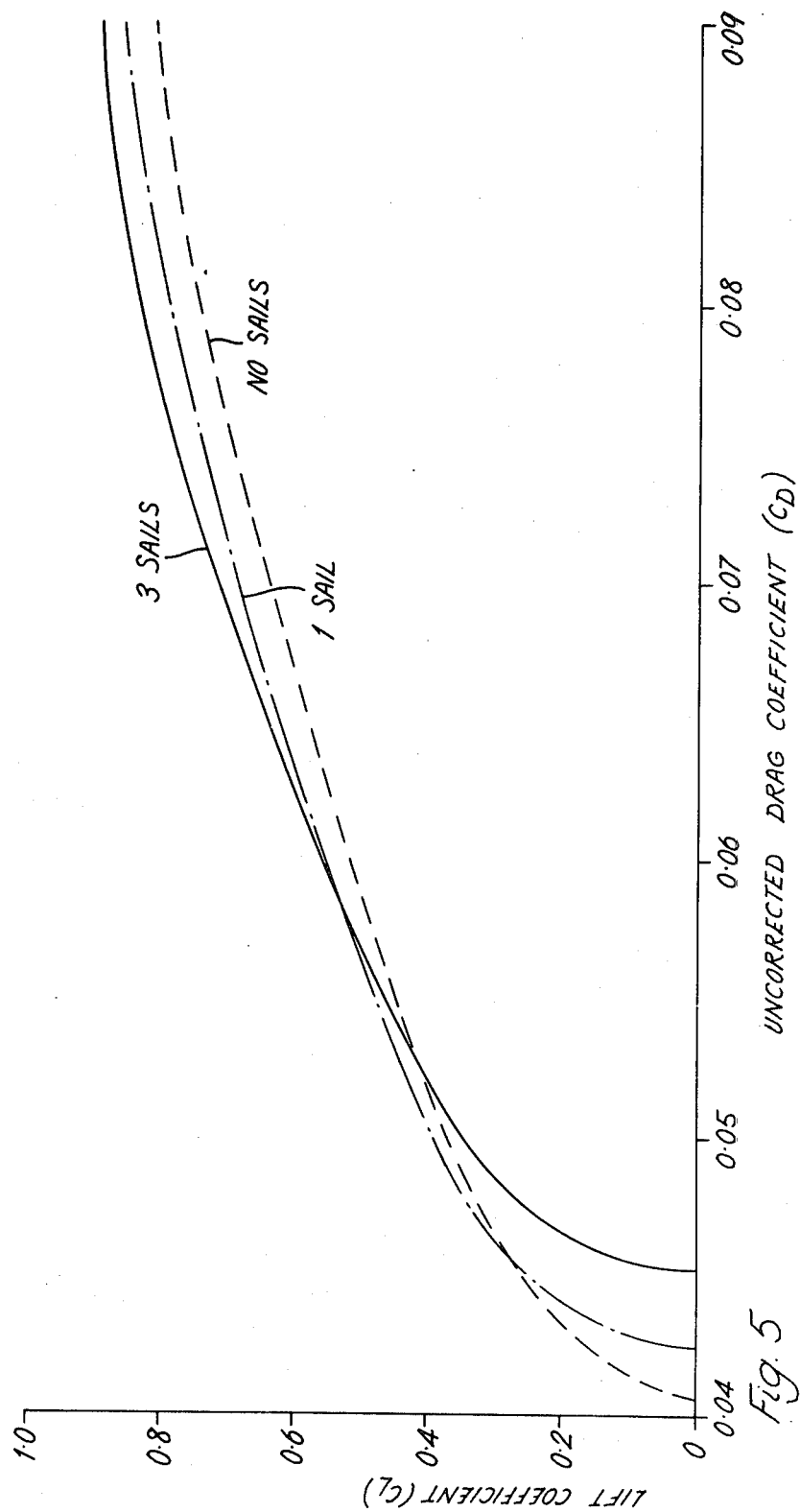
FIGS. 5 and 6 are graphs.

FIGS. 3 and 4 show three such sails mounted on a tip tank 10, itself in turn mounted upon the tip of a conventional-type wing 11 of an aircraft. Track 12 illustrates the path of a local stream of air that is created close to the surfaces of wing and tank during flight. This path leads from the underside of the wing with rearward and rotary components to its motion. It passes up and around the wall of tank 10 and then heads inwards and backwards toward wing 11, but is intercepted by the leading sail which turns it into the direction of the tangent 13 to the sail centre line at the trailing edge of the sail, which is so mounted that in a typical condition of flying, e.g. normal cruising altitude, the tangents along the whole trailing edge of the sail, from root to tip, lie parallel to the free stream. In practice the set of the trailing edge tangents will be chosen so as to offer the best overall contribution to the flight performance of the aircraft, having regard to the need to offer a substantial benefit in some flying conditions while avoiding creating a serious liability in any others. In turning the stream the leading sail experiences a force in direction 14 after the manner of a close-hauled boat sail, and this force may be resolved into a forward component which helps to propel the aircraft. The two other sails shown in FIGS. 3 and 4 work similarly upon the similar regions of the local stream that they intercept, and the sails are staggered as shown not only to avoid the forward sails spoiling the impact of the local stream upon the more rearward—for instance by the rearward sails lying within the wake of the forward—but also possibly to create positively favourable interference effects. Tests with such a three-sail arrangement have been conducted with the rear sail located at about 75% of the wing tip chord and projecting horizontally as shown, the forward sail at about 40% wing tip chord and pointing upwards and the third sail midway between the others in both wing tip chord position and inclination. FIGS. 3 and 4 illustrate that while the part of the local stream close to the wing and tank turns sharply around tank 10, and thus lies at a comparatively great angle to the free stream direction and needs a strong camber at the root of the sail to turn it, the weaker local stream 12a, which is further from the surfaces of the wing and tank, is less angled to the free stream direction and this only requires the lesser camber of the sail tip to straighten it. FIG. 5 shows the uncorrected drag coefficients for three tested aircraft wing designs, plotted graphically against lift coefficient. Each tested wing carried a tip tank as in FIGS. 1 and 2, but one of the designs carried three sails arranged as in FIGS. 3 and 4, another carried only one with its span horizontal and located at about 75% wing tip chord, and the third design carried no sail at all. Since the drag coefficients are uncorrected for rig tare drag the graphical zero must be considered a false one. At zero lift coefficient the sails increased the drag coefficient dramatically by eight drag counts per sail. This is not surprising since the sails were cambered and mounted in a manner appropriate to a lift coefficient of about 0.7. Flow visualisation tests at zero wing incidence showed that a severe separation occurred over most of the inner concave surface of the sails. However this disappeared quite rapidly with increase in wing incidence and at an overall lift coefficient of 0.8 the three sails per tank had reduced the drag coefficient by 108 counts whilst the single sail per tank had reduced the drag coefficient by 71 counts.

Figure 6:
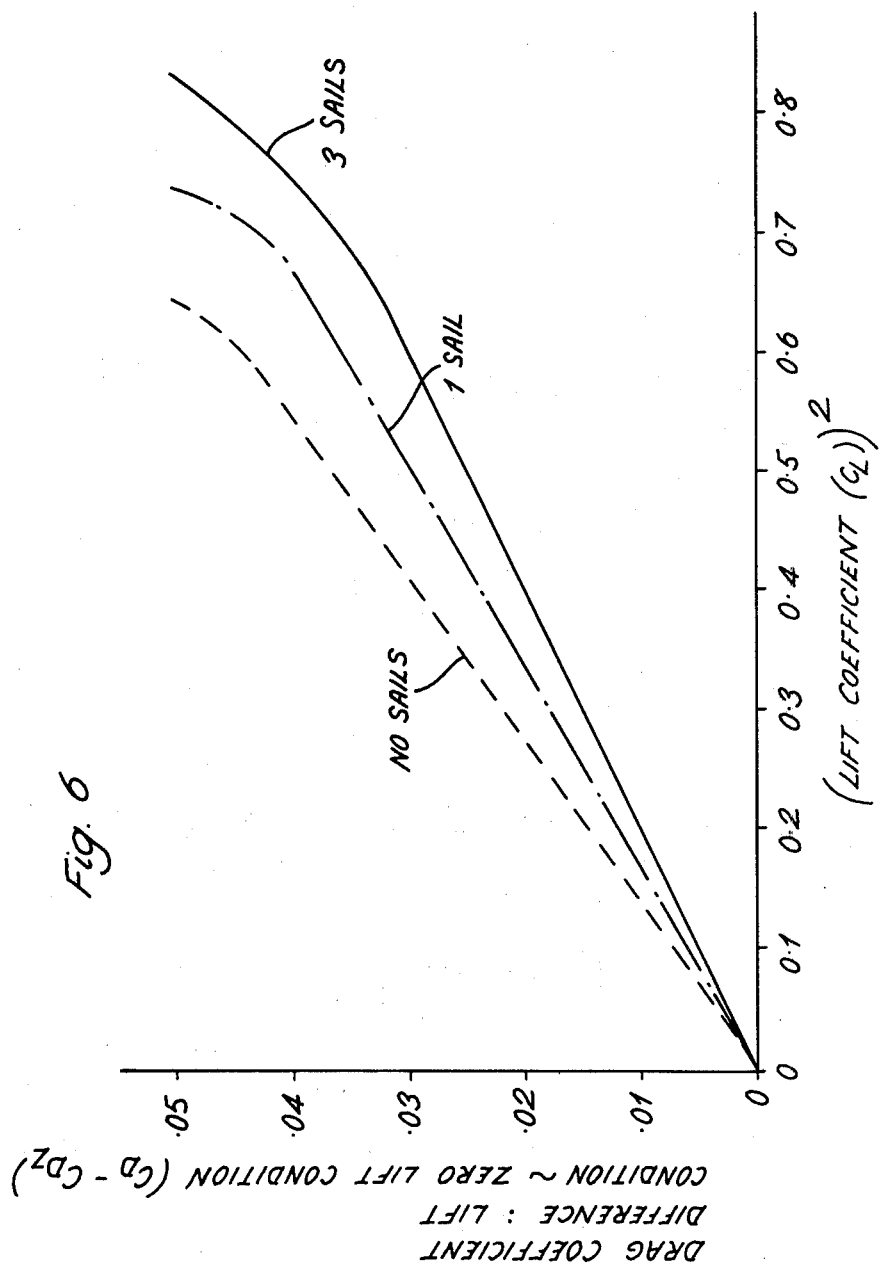

The effect of the sails can be seen more clearly in FIG. 6 where the difference in drag coefficient between a lift condition and the zero lift condition is plotted against the square of the lift coefficient. This shows that the sails reduced the lift-dependent drag dramatically, the single sail increasing the effective aspect ratio of the wing by 23% whilst the three sails increased it by 46%.

FIGS. 1 to 6 all illustrate models of devices and aircraft wings, and tests upon them. FIGS. 1 and 2 are approximately to full scale, and the illustrated sail had a span-to-mean-chord ratio of 3.5; the nominal thickness chord ratio was 15%, and the taper ratio 0.4. FIGS. 3 and 4 are to a scale of 0.4:1 approximately, and the area of each sail was 0.6% of that of the aircraft wing. FIGS. 5 and 6 relate to tests of this model in an 8'×6' wind tunnel at a Reynolds number of $1.1 \times 10^6$ based on wing mean chord or about $1.1 \times 10^5$ based on sail mean chord.

FIG. 10 shows another application to an aircraft wing tip, viewed from a position below the wing, and both forward and outboard of it. Because of the possible structural difficulty of anchoring the four sails 41 to 44 securely to an ordinary wing tip, the original tip of wing 45 has been cut away to receive a robust body 46 to which the roots 47 of the sails are anchored; a body such as 46 may of course be omitted if secure anchoring is possible without it. The profile of body 46 is such that when the body is in place it gives to the wing a tip profile as nearly similar as possible to the original, the small cylindrical tail 48 of the body having little aerodynamic effect other than that of fairing what would otherwise be a bluff body. Sails 41 to 44 are so mounted on body 46 that their edges 49 all pass through the fore-and-aft axis 50 of the body, which is effectively the chord-line of the wing tip. The line of each trailing edge 49 passes through the axis 50 and in tests for the reduction of the lift-dependent drag of the wing the best results were obtained when the difference in the angular setting of adjacent sails about axis 50 was in the region of 10°-20°. For the reduction of lift-dependent drag, best results were also obtained when the whole array of sails lay as nearly as possible horizontal, that is to say the trailing edges of sails 42 and 43 lay on opposite sides of the plane of the wing, and equally inclined to it. Sails with spans of up to about 50% of wing tip chord were tested, and results of the best overall promise were obtained when the span of each sail was about 25% especially 24% of the wing tip chord C, and when the root chord c of each sail was about 16% of wing tip chord C, so that the whole array of sails had a total chord of rather over C/2. Tests have suggested that with greater or lesser numbers of sails the ratio of the total of the root chords c of the individual sails to the wing tip chord C should still generally lie between about one-half and three-quarters, although possibly rising to full wing tip chord in certain cases.

A fixed geometry sail will have a camber distribution which is optimum for only one aircraft incidence. At other incidences the turning of the local flow by the sail is partly by incidence effects rather than by camber. This tends to produce a pressure distribution with a much sharper "peak", and so with the danger of flow separation, particularly at high sub-sonic flight speeds. A camber distribution which varied with aircraft incidence might be an ideal solution, but this might be both costly and heavy in some instances.

A possible alternative solution is to mount the sails so that they can be turned, relative to the aircraft surface, about their span axes. This solution is illustrated in FIG. 11: the span axis of sail 20 projects substantially horizontally outwards from the tip 21 of an aircraft wing 22. The sail is mounted on a shaft 23, which is rotatable by a motor 24 controlled by a device 25 responsive to aircraft incidence. The reasons why such turning may enable the sails to act more effectively at incidences other than the original one may be summarised by stating that the ideal variation in camber, from root to tip, changes with aircraft incidence. Varying the root setting of a sail with a fixed spanwise camber distribution allows a compromise to be achieved between high thrust on the sail and low sail complexity.

Another alternative could be to mount the sails so that they are capable of being retracted into, or projected further from the aircraft surface. Such projection or retraction may help the sails to match changes of incidence more effectively than fixed sails can, because for wing tip-mounted sails the variation in chamber from root to tip decreases with decrease in aircraft incidence as does the distance from the root over which a useful thrust force can be generated. By withdrawing part of the sail into the wing tip as the aircraft incidence is reduced, or extending the sail from the wing tip as incidence increases, an approximate matching of sail camber to local flow direction can be achieved. This solution is illustrated in FIG. 12 where the sail 30 is mounted on a rack 31 engaging with a pinion driven by motor 32, which is controlled by a device 33 respective to aircraft incidence. By driving the rack 31, the motor 32 can move sail 30 between its fully extended position (as shown) and a fully retracted position in which it lies entirely within a recess 34 formed within the tip of wing 35.

Another possibility, for multi-sail arrangements mounted on a wing tip body and thus of the general kind shown in FIGS. 3 and 4, is to mount the body for rotation about a fore-and-aft axis. Such an arrangement is shown in FIG. 13 where the body 60 on the tip of an aircraft wing 67 carries three sails 61, 62 and 63 and is rotatable about fore-and-aft axis 64 by a motor 65 controlled by a device 66 responsive to aircraft incidence. The sails are shown in full lines in the setting they may occupy for normal flight. For high lift, however, motor 65 may rotate body 60 through 75°, say, so that the sails occupy their dotted line positions.

A further alternative solution is suggested by noting that the angle of the local flow direction to that of the free stream, expressed as a fraction of the wing incidence, varies regularly with distance from the tank. Thus if the sails have variable sweep, the sweep angle may be changed with aircraft incidence in such a way that the active span of the sail, that is to say the span actually projecting from the wing, presents substantially the correct camber (for the chosen aircraft incidence) from one end to the other. As the speed of the aircraft increases, its incidence will decrease and the sails can be swept more. At extreme sail sweep angles the camber would tend towards an anhedral effect rather than a camber and thus would not be likely to induce high local velocities. FIG. 7 suggests a possible sweep variation; in this Figure the sail 71 is rotated about axis 72 by motor 73 and to keep the sweep variation small, the most forward position corresponds to about 30° sweep and the most aft to about 70°.

The forward thrust on such sails is likely to be a maximum when aircraft speed is low and incidence is high since the sails should provide a thrust proportional to the lift-dependent drag of the aircraft. A simple spring—'g' feel control system for the sweep angle may be satisfactory.

The sail principle can be applied to any condition when the local flow is at an angle to the free stream direction. One obvious group of examples of this is when vortex flow is generated by a low aspect ratio body, a slender wing or strake at incidence. Consider the case of a slender wing with moderately sharp leading edges. Then at all but small incidences a pair of spiral vortex sheets will spring from the leading edges, causing severe changes in the local flow directions inboard of the leading edge. If towards the trailing edge, or just behind it, vertical sails 74 are erected, as shown in FIGS. 8 and 9, through the core of the vortex, they will experience a marked sidewash, varying from outwards near the wing surface to inwards above the core of the flows and in tending to unwind the vortex would experience a thrust which could be a significant fraction of the drag associated with that vortex. Although the scale of the Figures does not permit this to be shown clearly, typical sails of the kind shown in FIGS. 8 and 9 may have a camber of one sense at the root, and on progressing from the root to the tip that camber first increases to a maximum, then falls to zero in the region of the predicted core of the vortex, then rises in the opposite sense and finally falls to near zero at the tip.

If the sail was pivoted at the zero camber section associated with the centre of the vortex sheet then a variation of sweep about this point would go a long way towards matching the camber distribution to the variation is sidewash associated with changes in wing incidence. The lateral shift of the vortex sheet centre with change of incidence is likely to be only a secondary effect. Again, the high speed, low wing incidence case corresponds to the most swept position of the sails.

Although the invention has been described with reference mainly to sails with their spans substantially at right angles to the surfaces on which they are mounted, it applies equally to wings of swept configuration—both fixed sails and also sails that are swept in attitude but movable like, for instance, the sails shown in FIGS. 11 and 12. The invention applies also to sails mounted on a variety of surfaces of craft in motion within and relative to masses of fluid. For instance not only whole aircraft wings, but also parts of whole-span flaps which are deflected to give an aircraft extra lift at take-off and landing: in such a case the sails could be attached to such flaps at their outboard ends, or to the stationary wing near these ends. It is contemplated that it might be necessary to arrange that such sails became operative only when the flaps themselves were operative, and were retracted or otherwise made inoperative at other times to avoid then interfering with the proper flow of air over the wing. The invention applies also to surfaces of stationary craft dependent on gaseous movement (e.g. the vanes of windmills), to the surfaces of boats, water wheels and other apparatus dependent on the movements of non-gaseous fluids, to rotary and other moving surfaces of aircraft such as the blades of helicopter rotors, and to aerofoil surfaces on ground vehicles, e.g. racing vehicles. For helicopters the invention may have particular uses in reducing the effect of the vortices which form behind each blade, and which in the descent mode may cause adverse blade-vortex interference. Another consequence of the "vortex unwinding" behaviour of the sails is that it not only reduces the lift-dependent drag, but also reduces the initial strength of the trailing vortex and causes it to diffuse more rapidly as downstream distance increases. This suggests that use of the present invention may allow aircraft to fly more closely behind others than is now possible, thus reducing separation times at airfields. A reduction in tip vortex strength is also likely to be of benefit to cropspraying aircraft, operating close to the ground.

I claim:

1. A body intended for motion within and relative to a mass of fluid, in which:

said body presents a surface which will in use form an interface with said mass of fluid;

an array comprising a plurality of members of cambered aerofoil cross-section having mountings upon said surface so as to project outwards from said surface into the space where a local stream of fluid will form in use, whereby in such use said members will tend to divert said local stream back into the free stream and in so doing experience useful thrust, and in which the said camber of each said member varies to allow for the change in the direction of the said local stream as distance from said surface increases; and said members are staggered so as to have more forward, middle and more rearward members in the direction of the relative motion of said body and said fluid so that the more rearward of said members avoid the wake of the more forward of said members, and so that the impact of the more forward members upon the local stream causes a more favorable incidence of the local stream upon more rearward members than would exist if said more forward members were absent;

said body being an aircraft wing having a tip with said members projecting outwards from said tip;

said mountings of said members being staggered in a fore-and-aft direction, and in which each said member has a span of less than about 50% of the chord of said wing tip, and in which the total root chords of said members equal between about one-half and three-quarters of said wing tip chord.

2. A body intended for motion within and relating to a mass of fluid according to claim 1 in which said root chord of each said member is between about 10% and 20% of said wing tip chord.

3. A body intended for motion within and relating to a mass of fluid according to claim 2 in which said root chord of each said member is about 16% of said wing tip chord.

4. A body intended for motion within and relating to a mass of fluid according to claim 1 in which said mountings are also staggered to lie along at a portion of a spiral path which is opposite to that of the normal local flow around said tip in use.

5. A body intended for motion within and relating to a mass of fluid according to claim 4 in which the difference in angular setting between adjacent said members in said spiral stagger is between about 10° and about 20°.

6. A body intended for motion within and relating to a mass of fluid according to claim 5 in which said difference is about 15°.

7. A body intended for motion within and relating to a mass of fluid according to claim 5 in which the middle members of said array project outwardly from said wing tip in a direction similar to that of the span of said wing itself.

8. A body intended for motion within and relating to a mass of fluid according to claim 5 in which the middle members of said array point in a direction substantially at right angles to that of the span of said wing itself.

9. A body intended for motion within and relating to a mass of fluid according to claim 5 in which said array as a whole is mounted rotatably about a fore-and-aft axis, whereby said array may be rotated to different settings to suit different flight conditions of said aircraft.

10. A device to reduce the drag experienced by bodies in motion within and relative to masses of fluid, comprising:

a body intended for motion within and relative to a mass of fluid and presenting a body surface;

a member of cambered aerofoil cross-section having a given length mounted upon said surface so that the span of said member projects outward from said surface into the space where a local stream of fluid will form in use, whereby in such use said member will tend to divert said local stream back into the free stream and in so doing experience useful thrust;

in which said camber of said cross-section of said member varies to allow for change in the direction of said local stream, the variation in said camber occurring over the length of said member from a high degree of camber in one sense near said surface, said degree of camber first falling to zero along said length and then increasing in the opposite sense near the tip end of said span of said member.

11. A device to reduce drag as claimed in claim 10 wherein said camber of said member falls to near zero in the vicinity of the tip of said span of said member.

* * * * *